US 8,806,476 B2

(12) United States Patent
Kapoor et al.

(10) Patent No.: US 8,806,476 B2
(45) Date of Patent: Aug. 12, 2014

(54) IMPLEMENTING A SOFTWARE INSTALLATION PROCESS

(75) Inventors: Rohit Kapoor, Richmond Hill (CA); Manqing Li, Nepean (CA); Glen Shortliffe, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 1967 days.

(21) Appl. No.: 11/375,969

(22) Filed: Mar. 14, 2006

(65) Prior Publication Data

US 2007/0220032 A1    Sep. 20, 2007

(51) Int. Cl.
*G06F 9/44* (2006.01)
*G06F 9/445* (2006.01)
*G06F 11/00* (2006.01)

(52) U.S. Cl.
USPC ............ 717/175; 717/169; 717/170; 714/37; 714/38.1; 714/39

(58) Field of Classification Search
None
See application file for complete search history.

(56) References Cited

U.S. PATENT DOCUMENTS

| | | | |
|---|---|---|---|
| 4,970,726 A | 11/1990 | Carn et al. | |
| 5,153,881 A * | 10/1992 | Bruckert et al. | 714/10 |
| 5,291,494 A * | 3/1994 | Bruckert et al. | 714/24 |
| 5,761,308 A * | 6/1998 | Torii et al. | 705/52 |
| 6,075,943 A * | 6/2000 | Feinman | 717/175 |
| 6,182,095 B1 * | 1/2001 | Leymaster et al. | 715/236 |
| 6,226,784 B1 * | 5/2001 | Holmes et al. | 717/100 |
| 6,275,987 B1 * | 8/2001 | Fraley et al. | 717/127 |
| 6,314,532 B1 * | 11/2001 | Daudelin et al. | 714/38.14 |
| 6,327,706 B1 * | 12/2001 | Amberg et al. | 717/174 |
| 6,363,499 B1 * | 3/2002 | Delo et al. | 714/15 |
| 6,560,776 B1 * | 5/2003 | Breggin et al. | 717/176 |
| 6,698,018 B1 * | 2/2004 | Zimniewicz et al. | 717/175 |
| 6,789,215 B1 * | 9/2004 | Rupp et al. | 714/38 |
| 6,880,110 B2 * | 4/2005 | Largman et al. | 714/38.13 |
| 6,910,208 B1 * | 6/2005 | Zimniewicz | 717/174 |
| 6,948,038 B2 | 9/2005 | Berkowitz et al. | |
| 6,948,166 B2 * | 9/2005 | Barfield et al. | 717/174 |
| 6,981,252 B1 * | 12/2005 | Sadowsky | 717/176 |
| 7,080,372 B1 * | 7/2006 | Cole | 717/173 |
| 7,103,885 B2 * | 9/2006 | Foster | 717/170 |
| 7,146,542 B2 * | 12/2006 | Srinivasan et al. | 714/44 |
| 7,171,390 B1 * | 1/2007 | Song et al. | 705/52 |
| 7,171,628 B1 * | 1/2007 | Perttunen | 715/853 |
| 7,281,247 B2 * | 10/2007 | Lodwick et al. | 717/176 |
| 7,296,266 B2 * | 11/2007 | Curtis | 717/175 |
| 7,360,212 B2 * | 4/2008 | Blake et al. | 717/175 |
| 7,448,033 B1 * | 11/2008 | Kruger et al. | 717/175 |
| 7,496,913 B2 * | 2/2009 | Hayes et al. | 717/174 |
| 7,529,775 B2 * | 5/2009 | Bluvshteyn et al. | 1/1 |
| 7,546,597 B2 * | 6/2009 | Suzuki | 717/175 |
| 7,577,950 B2 * | 8/2009 | Imanishi | 717/169 |
| 7,644,313 B2 * | 1/2010 | Iqbal et al. | 714/38.14 |
| 7,703,091 B1 * | 4/2010 | Martin et al. | 717/174 |
| 7,707,571 B1 * | 4/2010 | Harris et al. | 717/177 |
| 7,861,241 B2 * | 12/2010 | Kumagai et al. | 717/174 |

(Continued)

*Primary Examiner* — Tuan Q. Dam
*Assistant Examiner* — Zheng Wei
(74) *Attorney, Agent, or Firm* — Lee Law, PLLC; Christopher B. Lee

(57) ABSTRACT

A method for implementing a software installation process so as to install, modify or uninstall a software program. The software installation process has a plurality of sequential steps, and the method comprises recording, for each sequential step commenced, step metadata identifying the sequential step so that the step metadata is associated with the software program. The step metadata is recorded in recoverable storage.

42 Claims, 7 Drawing Sheets

(56) References Cited

U.S. PATENT DOCUMENTS

| | | | |
|---|---|---|---|
| 7,890,949 B2* | 2/2011 | Inada | 717/174 |
| 7,926,053 B1* | 4/2011 | Rowe et al. | 717/175 |
| 7,941,656 B2* | 5/2011 | Hans et al. | 713/2 |
| 2002/0147974 A1* | 10/2002 | Wookey | 717/176 |
| 2002/0188939 A1* | 12/2002 | Hediger et al. | 717/174 |
| 2002/0188941 A1* | 12/2002 | Cicciarelli et al. | 717/175 |
| 2003/0005427 A1* | 1/2003 | Herrero | 717/178 |
| 2003/0204843 A1* | 10/2003 | Barmettler et al. | 717/178 |
| 2004/0015956 A1* | 1/2004 | Barfield et al. | 717/174 |
| 2004/0015961 A1* | 1/2004 | Chefalas et al. | 717/178 |
| 2004/0123188 A1* | 6/2004 | Srinivasan et al. | 714/44 |
| 2004/0181713 A1 | 9/2004 | Lambert | |
| 2004/0187105 A1* | 9/2004 | Inada | 717/174 |
| 2004/0194084 A1* | 9/2004 | Matsunami et al. | 717/174 |
| 2004/0268345 A1* | 12/2004 | Lodwick et al. | 717/176 |
| 2005/0055692 A1* | 3/2005 | Lupini et al. | 717/174 |
| 2005/0102667 A1* | 5/2005 | Barta et al. | 717/174 |
| 2005/0120273 A1 | 6/2005 | Hudson et al. | |
| 2005/0160421 A1* | 7/2005 | Bluvshteyn et al. | 717/174 |
| 2005/0226641 A1* | 10/2005 | Ando et al. | 399/8 |
| 2005/0257086 A1 | 11/2005 | Triou, Jr. et al. | |
| 2006/0101461 A1* | 5/2006 | Han | 717/174 |
| 2006/0265707 A1* | 11/2006 | Hayes et al. | 717/174 |
| 2007/0028229 A1* | 2/2007 | Knatcher | 717/174 |
| 2007/0220317 A1* | 9/2007 | Gerhart et al. | 714/10 |
| 2007/0226726 A1* | 9/2007 | Robsahm | 717/168 |
| 2007/0240150 A1* | 10/2007 | Gangwar et al. | 717/174 |
| 2007/0245344 A1* | 10/2007 | Kumagai et al. | 717/174 |
| 2008/0005735 A1* | 1/2008 | Curtis | 717/174 |
| 2008/0177711 A1 | 7/2008 | Blake et al. | 707/3 |
| 2009/0150881 A1* | 6/2009 | Lupini et al. | 717/174 |

* cited by examiner

IMPLEMENTING A SOFTWARE INSTALLATION PROCESS

BACKGROUND OF THE INVENTION

The present invention relates to software installation, and more particularly to a method, computer program product and system for implementing a software installation process.

When a new software program is acquired (usually through licensing rather than outright purchase), it usually must be installed on the target data processing system before it can be used. As used herein, the term "data processing system" is intended to have a broad meaning, and may include personal computers, laptop computers, palmtop computers, handheld computers, network computers, servers, workstations, cellular telephones and similar wireless devices, personal digital assistants and other electronic devices on which software programs may be installed.

Typically, software programs include as a component thereof an installer, which is software that substantially automates the installation process. In addition, computer operating systems (software which coordinates resource use by, and interaction between, other software) may include an installer for use in installing drivers or other software.

In addition, many commercial software programs are provided with a process by which they may be updated. Such a process can be included as a component of the software program itself, or may be provided externally. The provision of an updating process is desirable because software programs are frequently modified by end users, for example by applying bug fixes or enhancements (such as new versions of the software).

There are many different processes for installing and/or updating software programs. Some processes are entirely automated and substantially invisible to the user, while others are interactive. Some are complex while others are simpler. Software programs used to install new software, to install updates to software, and to uninstall (remove) software are referred to herein as "installer applications". The term "installer applications" is intended to encompass both "standalone" software programs that can be used to install a variety of software applications (for example, such as installers that may be provided with an operating system), as well as software programs that are adapted to install only a single software application (and may be integrated with the installation file package for that software application). Installer applications, when run, implement a software installation process.

One major issue facing installer applications is that if a catastrophic failure occurs while a target product is being installed or while an update is being applied to a target product, it may be impossible for the installer application to recover from the failure. The types of catastrophic failures that may occur during installation or updating of a software program include CPU failure, hard drive failure, general hardware failure, computer reset, inadvertent power down, loss of power, initiation of a kill process or software failure (which may or may not occur in the installer application itself).

In the event of a catastrophic failure, one or more aspects of the data processing system on which the installer application was running may be in a corrupted state. For example, only some of the required files may have been copied into storage accessible by the data processing system, or reconfiguration of an aspect of the data processing system may be incomplete. These problems are often compounded by the fact that in some failure scenarios, the user is not aware of the corrupted state and the installer application has no way to determine that the data processing system has been corrupted. If the installer application is launched again, the corruption of the data processing system may be further compounded by adding additional maintenance to the already unstable system. The system may behave erratically, unpredictably, and may crash.

SUMMARY OF THE INVENTION

In one aspect, the present invention is directed to a computer-implemented method of implementing, for a data processing system, a software installation process for a software program. The software installation process has a plurality of sequential steps, and the method includes recording in recoverable storage, for each sequential step commenced, step metadata identifying the sequential step so that the step metadata is associated with the software program.

Preferably, the method also includes recording, in recoverable storage, completion metadata corresponding to a completed state for the software installation process following completion of the last sequential step of the software installation process so that the completion metadata is associated with the software program. In a preferred embodiment, the step metadata corresponding to each step is recorded prior to commencement of the step to which the step metadata corresponds.

Preferably, prior to initiating the software installation process, the method checks a metadata record from a most recent previous iteration of the software installation process to determine whether a failure occurred during the most recent previous iteration of the software installation process. If the method determines that no failure occurred during the most recent previous iteration of the software installation process, the method will initiate the software installation process. If the method determines that a failure occurred during the most recent previous iteration of the software installation process, the method will present a user of the data processing system with one or more options for remedial action. The one or more options for remedial action preferably comprise one or more procedures selected from a plurality of predefined procedures. The method selects the procedure in response to identification of the sequential step of the most recent previous iteration of the software installation process at which the failure occurred.

In one embodiment of the present invention, the software installation process is a process for updating a software program. In this particular embodiment, the sequential steps include a first sequential step of creating a backup record for the software program, the backup record comprising copies of each file to be affected by the software installation process and further comprising metadata sufficient to enable restoration of the software program, a sequential step of doing at least one of writing one or more new files, deleting one or more existing files and overwriting one or more existing files to generate a modified software program that is usable by the data processing system, and executing a configuration process to reconfigure the data processing system to utilize the modified software program. In one particular instance of this embodiment, the configuration process is executed prior to the step of doing at least one of writing one or more new files, deleting one or more existing files and overwriting one or more existing files to generate the modified software program. In another particular instance of this embodiment, the configuration process is executed after the step of doing at least one of writing one or more new files, deleting one or more existing files and overwriting one or more existing files to generate the modified software program. In yet another particular instance of this embodiment, the configuration process comprises a first portion that is executed prior to the step of doing at least one of writing one or more new files, deleting one or more existing files and overwriting one or more existing files to generate the modified software program, and a second portion that is executed after the step of doing at least one of writing one or more new files, deleting one or more existing files and overwriting one or more existing files to generate the modified software program.

In another embodiment, the software installation process is for installing new software. In this embodiment, the sequential steps include a first sequential step of creating a backup record for the data processing system, the backup record comprising copies of each file to be affected by the software installation process and further comprising metadata sufficient to enable restoration of the data processing system to a state that existed prior to commencement of the software installation process, a sequential step of doing at least one of writing one or more new files and overwriting one or more existing files so as to place the software program in persistent storage accessible by the data processing system so that the software program is usable by the data processing system, and executing a configuration process to reconfigure the data processing system to utilize the software program. In a particular instance of this embodiment, the configuration process is executed prior to the step of doing at least one of writing one or more new files and overwriting one or more existing files to place the software program in persistent storage accessible by the data processing system. In another particular instance of this embodiment, the configuration process is executed after the step of doing at least one of writing one or more new files and overwriting one or more existing files to place the software program in persistent storage accessible by the data processing system. In yet another particular instance of this embodiment, the configuration process comprises a first portion that is executed prior to the step of doing at least one of writing one or more new files and overwriting one or more existing file to place the software program in persistent storage accessible by the data processing system, and a second portion that is executed after the step of doing at least one of writing one or more new files and overwriting one or more existing files to place the software program in persistent storage accessible by the data processing system.

In still another embodiment, the software installation process is a process for uninstalling a software program. In this embodiment, the plurality of sequential steps includes doing at least one of writing one or more files, overwriting one or more existing files and deleting one or more existing files so as to return an aspect of a persistent storage accessible to the data processing system to a state that existed prior to installation of the software program, and executing a configuration process to reconfigure an aspect of the data processing system to a configuration that existed prior to installation of the software program.

The present invention is also directed to a computer program product for implementing the above-described method on a data processing system, and to a data processing system on which the above-described method is implemented.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of certain illustrative embodiments when read in conjunction with the accompanying drawings, wherein:

DETAILED DESCRIPTION OF A PREFERRED EMBODIMENT

Figure 1:
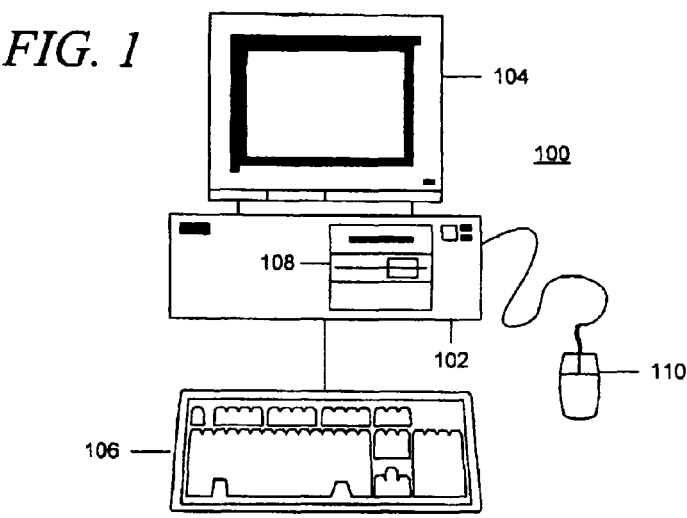
FIG. 1 is a pictorial representation of an exemplary data processing system in which aspects of the present invention may be implemented.
Figure 2:
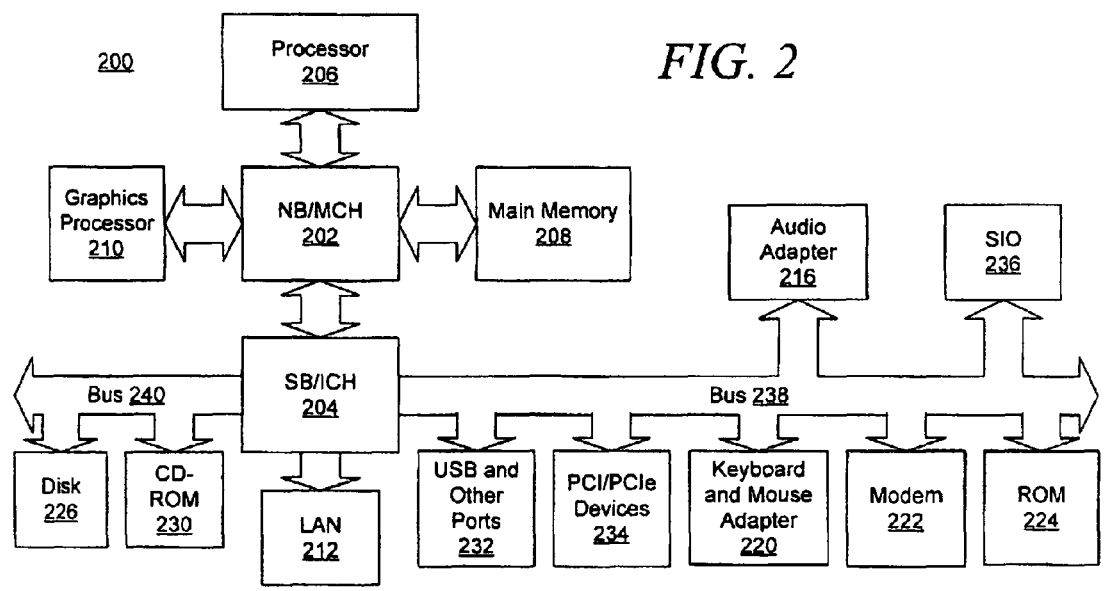
FIG. 2 is a block diagram of an exemplary data processing system in which aspects of the present invention may be implemented.

With reference now to the figures and in particular with reference to FIGS. 1-2, exemplary diagrams of data processing environments are provided in which aspects of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention as defined by the appended claims.

FIG. 1 is a pictorial representation of a data processing system in which aspects of the present invention may be implemented. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like.

Computer 100 may be implemented using any suitable computer, such as an IBM® eServer™ computer or IntelliStation® computer, which are products of International Business Machines Corporation, located in Armonk, N.Y. Although the depicted representation shows a personal computer, exemplary aspects of the present invention may be implemented in other types of data processing systems, such as laptop computers, palmtop computers, handheld computers, network computers, servers, workstations, cellular telephones and similar wireless devices, personal digital assistants and other electronic devices on which software programs may be installed. Computer 100 also preferably includes a graphical user interface (GUI) that may be implemented by means of systems software residing in computer readable media in operation within computer 100.

With reference now to FIG. 2, a block diagram of a data processing system is shown in which aspects of the present invention may be implemented. Data processing system 200 is an example of a computer, such as personal computer 100 in FIG. 1, in which code or instructions implementing the processes of the exemplary aspects may be located. In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are connected to north bridge and memory controller hub 202. Graphics processor 210 may be connected to the MCH 202 through an accelerated graphics port (AGP), for example.

In the depicted example, local area network (LAN) adapter 212 connects to south bridge and I/O controller hub 204 and audio adapter 216, keyboard and mouse adapter 220, modem 222, read only memory (ROM) 424, universal serial bus (USB) ports and other communications ports 232, and PCI/PCIe devices 234 connect to south bridge and I/O controller hub 204 through bus 238. Hard disk drive (HDD) 226 and CD-ROM drive 230 connect to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be connected to south bridge and I/O controller hub 204.

A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter.

An operating system runs on processor 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200. (Java and all Java-based trademarks are trademarks of Sun Microsystems, Inc. in the United States, other countries, or both.)

Instructions for the operating system, the object-oriented programming system, and applications or programs are located on storage devices, such as hard disk drive 226, and may be loaded into main memory 208 for execution by processor 206. The processes of the present invention are performed by processor 206 using computer implemented instructions, which may be located in a memory such as, for example, main memory 208, read only memory 224, or in one or more peripheral devices.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which may be configured with flash memory to provide non-volatile memory for storing operating system files and/or user-generated data. A memory may be, for example, main memory 208 or a cache such as found in north bridge and memory controller hub 202. A processing unit may include one or more processors. The depicted examples in FIGS. 1-2 and above-described examples are not meant to imply architectural limitations. For example, data processing system 200 also may be a tablet computer, laptop computer, or telephone device in addition to taking the form of a PDA.

As was noted above, distinctions can be made between "installation" of a software program which does not already reside in a usable state in storage accessible to a data processing system, "updating" a software program where an (earlier) version of that software program already resides in storage accessible to the data processing system, and "uninstalling" (deleting) a software program from storage accessible to a data processing system. As a practical matter, these three processes are quite similar and the terms "install", "installation" and "software installation process" shall be used herein to refer to each of the above cases. For clarity, the terms "new install" and "new installation" shall be used to refer to the case where the relevant software program does not already reside in storage accessible to the data processing system, and the terms "update" and "updating" shall be used to refer to cases where modifications are made to a software program that already resides in storage accessible to the data processing system. The term "uninstall" shall be used where a software program is being removed from storage accessible to the data processing system.

In accordance with an aspect of the present invention, a software installation process is organized into distinct sequential steps where only certain operations are permitted during each step, and each step completes prior to commencement of the next step. In one exemplary embodiment directed to a new installation or an update, the software installation process comprises three distinct steps: (1) back up all current files that are to be updated (Backup Step); (2) install new files and/or overwrite existing files and/or delete existing files (Install Step); and (3) apply configuration actions or run scripts that make modifications to the configuration of the data processing system (Configuration Step). Generally, the "delete existing files" portion of step (2) is only relevant for updating existing software, and existing files are usually not deleted when installing new software. Existing files may or may not be deleted when uninstalling software, depending on the specific scenario.

Figure 3:
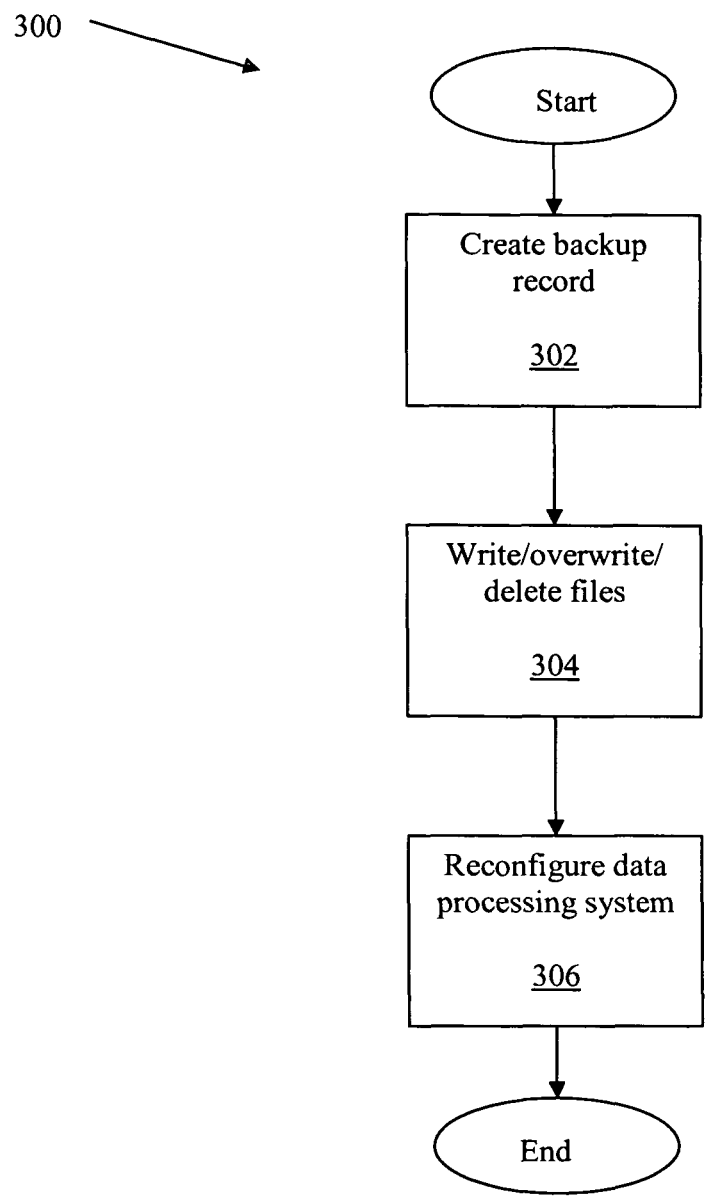
FIG. 3 is a flow chart showing an exemplary software installation process according to an aspect of the present invention.

After all steps have been completed successfully, the operation is complete. With reference to FIG. 3, the preceding sequential steps are illustrated by way of a flow chart for an exemplary software installation process 300.

First, the software installation process creates a backup record for the data processing system (step 302). Although the backup creation step 302 is not strictly necessary for installation of the software program, it is highly desirable because it may enable system recovery in the event that the installation process fails, and may also allow the relevant software program to be uninstalled if the user later wishes to do so. Typically, the backup record will include copies of each file that would be affected by the software installation process, and will also include metadata sufficient to enable restoration of the data processing system to the state that existed prior to commencement of the software installation process. Preferably, a complete backup of all components is made before a single file on the data processing system is modified, installed, deleted or overwritten, as this will provide better remedial options if a catastrophic failure occurs (i.e. backup step 302 completes before the next step 304 commences). Where this is not the case, for example where a software installation process alternates between creating backup copies of files and updating files for each component, then failure recovery may become more difficult. Preferably, the backup package created when installing an update is a "mirror image" of the installation or update package, which allows for the new software program or update to be later uninstalled by applying the backup package (i.e. "undoing" what was done by the installation or update).

Once the backup record has been created (or if the software installation process does not create a backup record), the software installation process 300 will then write one or more new files, or overwrite one or more existing files, or both, into a persistent storage that is accessible by the data processing system (step 304). (In the case of an update, the step 304 may also involve deleting some existing files.) Step 304 is the process that will place the files for the target software program into a storage location where they can be accessed by the data processing system so that the data processing system can use those files to execute the target program.

Typically, simply writing (and/or overwriting) the desired files is not sufficient to enable the data processing system to use the files so as to effectively execute the target program. In addition, the data processing system must usually be reconfigured to enable it to use the files and run the target software program. Therefore, a software installation process typically executes a configuration process to reconfigure the data processing system to utilize the software program (step 306). As will be discussed further below, the configuration process may comprise one or more steps.

In the case of a new installation, the software installation process 300 will, upon successful completion, result in a new software program residing in storage accessible to the data processing system so that the data processing system can execute the new software program. In the case of an update, the result of successful completion of the software installation process 300 is that an existing software program (already residing in storage accessible to the data processing system) is modified, instead of a new software program being installed. It will be appreciated that in certain instances, an installation process may consist of fewer steps (as would be the case with omission of the backup step 302 or configuration step 306) or additional steps. One particular example of an installation in which the software installation process may include additional steps is where the configuration process comprises a first portion (pre-configuration) that is executed prior to writing and/or overwriting the targeted files, and a second portion (post-install configuration) that is executed after the targeted files are written and/or overwritten. Each of these portions may be considered a separate sequential step. In some embodiments, only pre-configuration may be necessary, that is, the entire configuration process is executed prior to the step of writing one or more new files and/or overwriting one or more existing files and/or deleting one or more existing files. In other embodiments, only post-install configuration may be necessary, that is, the entire configuration process is executed after the step of writing one or more new files and/or overwriting one or more existing files and/or deleting one or more existing files. As indicated above, in some instances, it may be necessary to carry out both pre-configuration and post-install configuration, and in other instances no configuration may be necessary. Thus, in the case of both a new installation and an update, the software installation process that is executed on the data processing system has a plurality of sequential steps. In a particular embodiment, each step of the software installation process alters an aspect of the data processing system. Creation of a backup record (step 302) alters an aspect of the data processing system by placing a backup record in storage accessible by the data processing system. Writing and/or overwriting and/or deleting files (step 304) alters an aspect of the data processing system by placing new files into storage accessible by the data processing system and/or replacing files that were already in storage accessible by the data processing system with new files and/or deleting files that were in storage accessible by the data processing system. Execution of the configuration process (step 306) alters an aspect of the data processing system by changing its configuration. Other steps by which an aspect of the data processing system is altered may also be possible.

In accordance with an aspect of the present invention, for each sequential step of the software installation process, step metadata corresponding to the step is recorded in storage that is recoverable in the case of a catastrophic failure. Thus, the selected storage should be of a type that would not be erased in the case of a catastrophic failure. Preferably, the storage in which the metadata resides should be directly accessible by the data processing system, but this is not strictly necessary so long as the metadata may be recovered in the event of a catastrophic failure. For example, a software installation process may be carried out by a first data processing system so as to remotely install software on a second data processing system, and the first data processing system may record the relevant metadata in its own storage, which may not be directly accessible by the second data storage system. Nonetheless, in the event of a catastrophic failure during a software installation process, the metadata stored in the first data processing system's storage could be recovered.

The step metadata is stored in such a way that it is associated with the software program in respect of which the software installation process operates, so that the metadata can be retrieved for subsequent iterations of the software installation process. For example, where the software installation process is used only to install a single software program, the step metadata may be stored in a file that also contains the filename for the software installation process. Alternatively, for a software installation process which may be used to install more than one software program (such as a software installation process used by an operating system to install drivers for many different peripheral devices), the step metadata may be stored in a database so that it is associated with the particular software program to which it relates.

In subsequent discussions, there is reference to various operations being carried out by a "process", "method" or "step". This terminology is used for convenience and ease of understanding. One skilled in the art will appreciate that the respective process, method or step is implemented by a data processing system, and that the operations referred to herein as being carried out by the "process", "method" or "step" are in fact carried out by various components (e.g. processor, memory, storage, etc.) of the data processing system on which the method is implemented.

Figure 4:
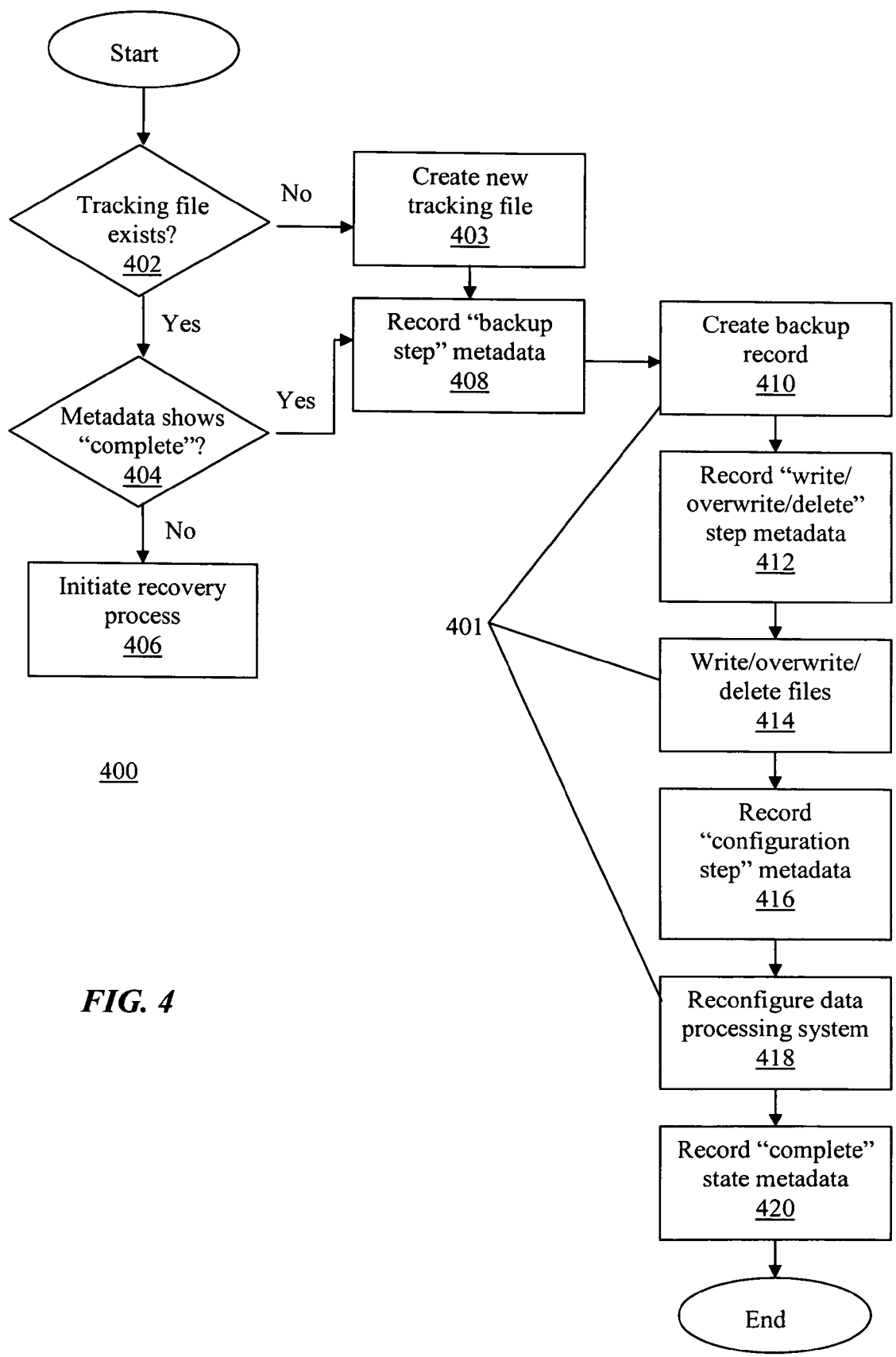
FIG. 4 is a flow chart showing an exemplary method for implementing a first software installation process according to an aspect of the present invention.

Referring now to FIG. 4, an exemplary method for implementing a software installation process according to an aspect of the present invention is shown generally at 400.

The software installation process itself is denoted by reference numeral 401, and comprises sequential steps 410, 414 and 418. Step 410 is the step of creating a backup record, which will consist of copies of each file that would be affected by the software installation process as well as metadata that is sufficient to enable restoration. Step 414 is the step of writing one or more new files, overwriting one or more existing files, or (in the case of an update process) deleting one or more existing files, or some combination thereof, and step 418 is the step of executing a configuration process to reconfigure the data processing system.

The software installation process 401 shown in FIG. 4 may be either a software installation process for installing new software or a software installation process for modifying (e.g. updating) existing software.

Where the software installation process 401 is one for installing new software, the backup record created at step 418 would be created so as to enable restoration of the data processing system to a state that existed prior to commencement of the software installation process 401, the writing/overwriting step 414 would place a software program in persistent storage accessible by the data processing system so that the software program is usable by the data processing system, and the configuration step 418 would reconfigure the data processing system to utilize the new software program.

Where the software installation process 401 shown in FIG. 4 is one for modifying existing software (i.e. updating), the backup record created at step 410 would be created so as to enable restoration of the software program to the form in which it existed prior to commencement of the software installation process 401, the writing/overwriting/deleting step 414 would generate a modified software program that is usable by the data processing system, and the configuration step 418 would reconfigure the data processing system to utilize the modified software program.

The steps of exemplary method 400 will now be described. Upon initiation, the method 400 first checks to see whether a tracking file for the software installation process already exists (step 402). If no such file exists, the method 200 concludes that the software installation process 401 has not previously been run on that particular data processing system (or for that particular software program, in the case of a generic software installation process), and creates a new tracking file (step 403), and then proceeds to record step metadata for the pre-backup state of the data processing system in the tracking file (step 408). If the method 400 determines that a tracking file already exists, the method 400 then checks to see if the tracking file is marked as "complete" (step 404). If the tracking file is marked as "complete", this indicates that the software installation process 401 has previously been run and that it successfully completed its most recent previous iteration. Thus, according to an aspect of the present invention, the method 400 checks the tracking file from the most recent previous iteration of the software installation process 401 prior to executing the software installation process 401, to determine whether a failure occurred during the most recent previous iteration of the software installation process 401. In response to a determination that no failure occurred during the most recent previous iteration of the software installation process 401 (i.e. the tracking file is marked as "complete"), the method 400 will execute the first step of the software installation process 401. Thus, following a determination that the tracking file is marked "complete", the method 400 proceeds to record (step 408) step metadata for the backup step (step 410) in the tracking file, in preparation for executing the first step (step 410) of the software installation process 401.

If the tracking file is not marked as "complete", this indicates that the software installation process 401 has previously been run but did not successfully complete its most recent iteration on that data processing system, and that the data processing system may therefore be in a corrupted state. Accordingly, the method 400 proceeds to initiate a recovery process (step 406) in which the method 400 preferably presents recovery options to a user. Thus, in response to a determination that a failure occurred during the most recent previous iteration of the software installation process 401 (i.e. the tracking file is not marked as "complete", the method 400 presents a user of the data processing system with one or more options for remedial action (this will be discussed further below). In an exemplary embodiment of a method according to an aspect of the present invention, the remedial actions are predefined procedures, and a plurality of such predefined procedures is available. Within this plurality, certain procedures would be appropriate remedial actions for failures that occurred during a certain step. For example, one particular procedure may be appropriate where a failure occurred during the backup step (e.g. step 410), and another procedure may be appropriate where a failure occurred during the write/overwrite/delete step (e.g. step 414). The method 400 will select the appropriate procedure(s) in response to identification of the sequential step of the most recent previous iteration of the software installation process 401 at which the failure occurred. Examples of such procedures for remedial action are discussed further below.

At step 408, the method 400 records "backup" step metadata in the tracking file prior to commencement of the step of creating the backup record (step 410). Thus, the method 400 records step metadata corresponding to the backup step in recoverable storage. Once the step metadata has been recorded (step 408), the method 400 executes the first step in the software installation process 401, that of creating the backup record (step 410).

After the method has created the backup record (step 410), the method 200 writes "write/overwrite/delete" step metadata into the tracking file (step 412). Thus, the method 400 records step metadata corresponding to the write/overwrite/delete step 414 in recoverable storage. In the illustrated embodiment, the method 400 carries out this step of writing step metadata 412 before any files are written, deleted or overwritten (step 414). After the method 400 has recorded the step metadata (step 412), the method 400 executes the next sequential step in the software installation process 401, that of writing and/or overwriting the targeted files (step 414).

Once the software installation process 401 has completed all necessary writing, deleting and overwriting of files (step 414), the method 200 will then write "configuration" step metadata to the tracking file (step 416) prior to the next sequential step of the software installation process 401, that of reconfiguring the data processing system (step 418). Accordingly, the method 400 records step metadata corresponding to the reconfiguration step 418 in recoverable storage (step 416). Analogously to the previous metadata recordation steps 408 and 412, in the illustrated embodiment, the method 400 carries out the step of recording step metadata (step 416) corresponding to the reconfiguration step 418 prior to execution of the reconfiguration step 418. Once the method 400 has recorded the step metadata (step 416), the method 400 executes the next sequential step in the software installation process 401, that of reconfiguring the data processing system (step 418).

Once the software installation process 401 has reconfigured the data processing system (step 418), the software installation process 401 is substantially complete. Accordingly, the method 400 records completion metadata (step 420) corresponding to the "completed" state of the software installation process 401.

As described above, in accordance with a method according to an aspect of the present invention (such as the exemplary method 400) there will be a tracking file containing step metadata corresponding to each sequential step (such as steps 410, 414 and 418) attempted by the software installation process 401. Where the software installation process 401 completes successfully, the tracking file will also preferably include "completion" metadata. The tracking file constitutes a metadata record, and is stored in recoverable storage so that it may be accessed following a catastrophic failure. Accordingly, the software installation process 401 is structured in distinct steps, and the current step of the software installation process 401 is tracked and step metadata is recorded while the software installation process 401 is ongoing.

As shown in FIG. 4, for each of steps 410, 414 and 418 of the software installation process 401, the method 400 records the corresponding step metadata prior to commencement of the respective step. Thus, in general, in accordance with an aspect of the present invention, a method according to the present invention preferably records step metadata corresponding to each step prior to commencement of the step to which the step metadata corresponds. While it is possible to record the step metadata during or even after the step to which the step metadata corresponds, such an approach suffers from a risk that a catastrophic failure may occur before the step metadata is recorded, such that the step metadata would not accurately represent the step during which the failure occurred.

It will be appreciated that the software installation process 401 (consisting of steps 410, 414 and 418) shown in association with the method 400 is exemplary only, and that many other software installation processes may be implemented in accordance with the present invention. For example, a software process according to an aspect of the present invention may include a pre-configuration step (not shown) and a method according to an aspect of the present invention would include a step of writing step metadata corresponding to the pre-configuration step (not shown) prior to executing the pre-configuration step.

In certain instances, it is desirable to "uninstall" a software program from a data processing system. For example, a particular software program may make substantial demands on the resources of a data processing system so that performance of the data processing system is degraded, or a particular software program may be incompatible with other software programs used by the data processing system so as to inhibit the overall effectiveness of the data processing system. Moreover, in some instances a software program may simply fail to function in accordance with its specifications so as to be of little or no value to a user.

A software installation process in accordance with an aspect of the present invention may be used to uninstall a particular software program from a data processing system. Generally, the process of uninstalling software comprises installing previously saved backup copies of relevant files reflecting the state of the data processing system prior to installation of the software program that is to be uninstalled. For example, if a data processing system had files A, B and C, and installation of a given software program replaced files B and C with files B1 and C1, respectively, and added file D, then uninstalling that software program would involve replacing files B1 and C1 with the backup copies of files B and C, respectively, and deleting file D from the data processing system. The backup copies of files B and C would have been made during a backup step (such as backup step 408 in FIG. 4) when installing the software program. (Reconfiguration of the data processing system may also be required.) Accordingly, a software uninstall process may be viewed as a software installation process, and the term "software installation process", as used herein, shall be deemed to encompass an uninstall process as well.

Figure 5:
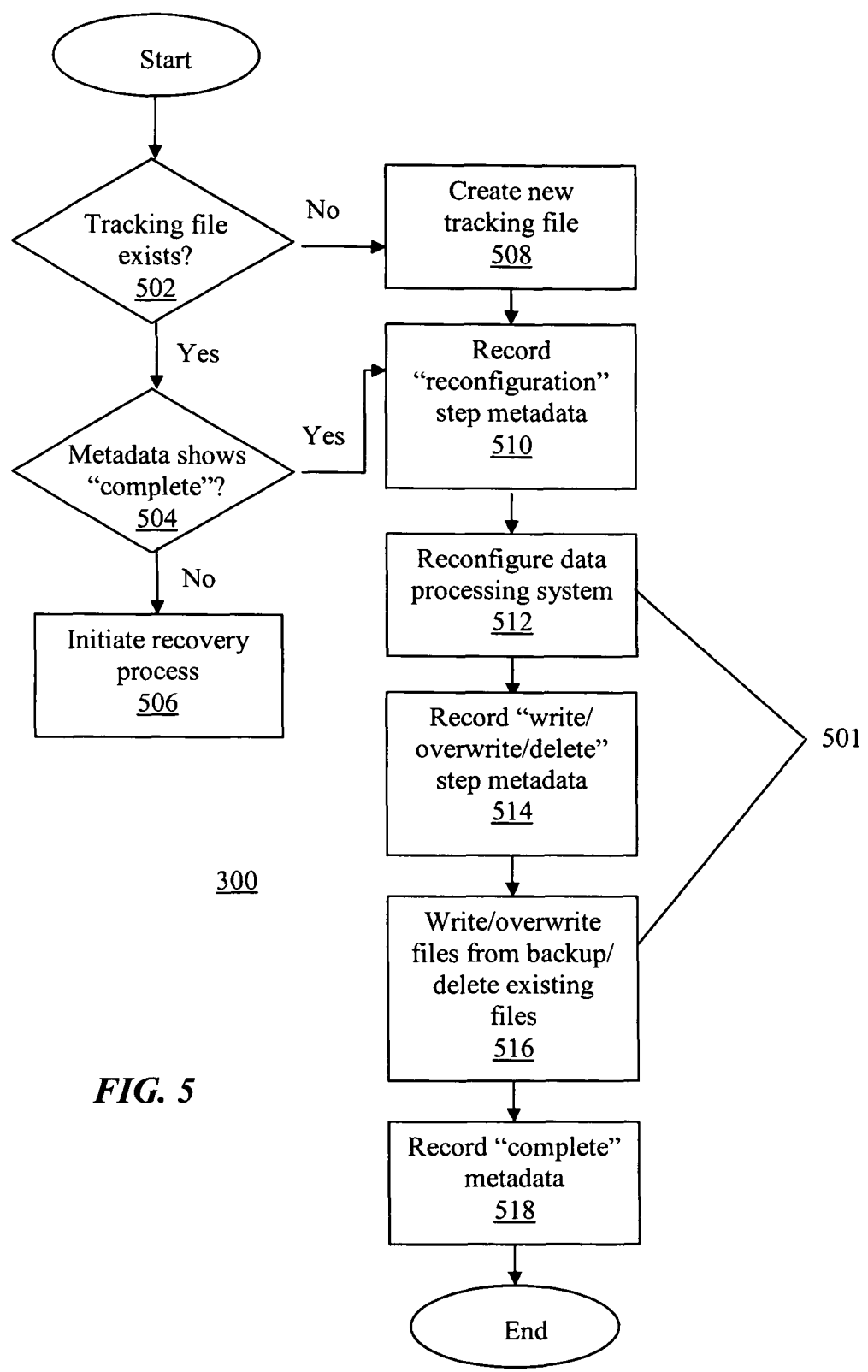
FIG. 5 is a flow chart showing an exemplary method for implementing a second software installation process according to an aspect of the present invention.

With reference now to FIG. 5, an exemplary method for use in uninstalling software, in accordance with an aspect of the present invention, is shown generally at 500. The software installation process used to uninstall the software program is denoted by reference numeral 501 and consists of steps 512 and 516.

More particularly, at step 512 the software installation process 501 shown in FIG. 5 will carry out at least one of writing one or more new files, overwriting one or more existing files and deleting one or more existing files so as to return an aspect of a persistent storage accessible to the data processing system to a state that existed prior to installation of a target software program. At step 516, the software installation process 501 shown in FIG. 5 will execute a configuration process to reconfigure an aspect of the data processing system to a configuration that existed prior to installation of the target software program.

Upon initiation, the method 500 first checks to see whether a tracking file for the software installation process 501 already exists (step 502). If no such file exists, the method 500 concludes that it is the first time that the software installation process 501 has been run on that particular data processing system (or at least the first time that it has been run for the purpose of uninstalling the targeted software program). The method 500 then creates a new tracking file (step 508), and records step metadata corresponding to the step of reconfiguring the data processing system (step 510). If the method 500 determines that a tracking file already exists, the method 500 then checks to see if the tracking file is marked as "complete" (step 504). If the tracking file is marked as "complete", this indicates that the software installation process 501 successfully completed its most recent previous iteration. Thus, according to an aspect of the present invention, the method 500 checks the tracking file from a most recent previous iteration of the software installation process 501 prior to executing the software installation process 501, to determine whether a failure occurred during the most recent previous iteration of the software installation process 501. In response to a determination that no failure occurred during the most recent previous iteration of the software installation process 501 (i.e. the tracking file is marked as "complete"), the method 500 prepares to execute the first step of the software installation process 501. Thus, after finding that the tracking file is marked as "complete", the method 500 proceeds to record step metadata corresponding to the reconfiguration step in the tracking file (step 510) in preparation for executing the first step (step 512) of the software installation process 501. If the tracking file is not marked as "complete", this indicates that the software installation process 501 did not successfully complete its most recent iteration on that data processing system, and that the data processing system may therefore be in a corrupted state. Accordingly, the method 500 proceeds to initiate a recovery process (step 506). Thus, in response to a determination that a failure occurred during the most recent previous iteration of the software installation process 501 (i.e. the tracking file is not marked as "complete"), the method 500 presents a user of the data processing system with one or more options for remedial action. These options are discussed in greater detail below.

At step 510, the method 500 will write step metadata corresponding to the step of reconfiguring the data processing system (step 512) into the tracking file. Accordingly, the method 500 records step metadata corresponding to the reconfiguration step 512 in recoverable storage (step 510). The method 500 carries out the step of recording step metadata (step 510) corresponding to the reconfiguration step 512 prior to execution of the reconfiguration step 512. Once the method 500 has recorded the step metadata (step 510), the method 500 executes the first step of the software installation process 501, that is, reconfiguration of the data processing system (step 512).

After the method 500 has reconfigured the data processing system (step 512), the method 500 writes step metadata (step 514) corresponding to the next step of the software installation process 501, that of writing and/or overwriting one or more files from backup and/or deleting one or more existing files (step 516). Thus, the method 500 records step metadata corresponding to the write/overwrite step 516 in recoverable storage. The method 500 carries out the step of writing step metadata 514 before permitting the software installation process 501 to write or overwrite any files (step 516). After the method 500 has recorded the step metadata (step 514), the software installation process 501 will write and/or overwrite the targeted files from the corresponding backup files (step 516). Step 516 may also include deleting some existing files.

Once the software installation process 500 has written and/or overwritten the appropriate files from backup and deleted any files requiring deletion (step 516), the software installation process 501 is substantially complete. Accordingly, the method 500 writes completion metadata (step 518) corresponding to the "completed" state of the software installation process 501.

By reference to the exemplary method 500 shown in FIG. 5, it is seen that the exemplary software installation process 501 for uninstalling software that is shown therein comprises a plurality of sequential steps (steps 512 and 516), and that the method 500 records step metadata corresponding to each step in a tracking file.

It will be appreciated that the method 500 for implementing the software installation process 501 for uninstalling a software program is exemplary only, and that many other software installation processes for use in uninstalling software programs may be implemented in accordance with an aspect of the present invention. For example, a software installation process in accordance with the present invention and useful for uninstalling software may include an additional configuration step to be executed after the targeted files are written and/or overwritten, and a method according to an aspect of the present invention would include an additional step of recording step metadata corresponding to the additional configuration step.

It will be appreciated that the primary difference between a software installation process that installs or updates a software program (such as the software installation process shown in FIG. 4) and a software installation process that uninstalls a software program (such as the software installation process shown in FIG. 5) is that where a software program is being uninstalled, a backup record is usually not generated. This is because the files needed to "un-uninstall" (that is, to reinstall) the software program would generally be available from the same source (such as a floppy disk, CD-ROM or Internet download) as was used to install the software program originally. In some instances, however, a backup step may be provided in a software installation process used for uninstalling a software program. For example, such a step could back up data files that were created by the software program that is to be uninstalled. A corresponding method according to an aspect of the present invention would include a step of recording step metadata for the backup step.

Advantageously, the provision of a metadata record (such as the above-described tracking files) in accordance with an aspect of the present invention may facilitate failure recovery steps in the event of a failure during a software installation process such as the software installation processes 401, 501 shown in FIGS. 4 and 5, respectively. A method according to an aspect of the present invention preferably updates the tracking file prior to commencement of each sequential step of the software installation process. Accordingly, if a failure occurs at any time during the software installation process, the tracking file will reflect the step during which the failure occurred.

As noted above, a method according to the present invention preferably checks at initialization to determine whether a tracking file for the software installation process 401, 501 exists (steps 402, 502) and if so whether the tracking file is marked as "complete" (steps 404, 504). If a tracking file exists but is not marked "complete", this indicates that a failure occurred during the most recent previous iteration of the software installation process 401, 501. Because the method 400, 500 records step metadata for each sequential step in the software installation process 401, 501, the tracking file will indicate the step of the software installation process 401, 501 during which the failure occurred. This information may facilitate the generation of a suitable failure recovery response, especially in cases where the most appropriate response depends on the sequential step during which failure occurred. Thus, the creation of a tracking file, updated for each sequential step of the software installation process 401, 501, may permit detection of the fact that a failure has occurred, identification of the step of the software installation process 401, 501 during which the failure occurred, and determination of appropriate potential remedial actions.

In general, and without limitation, possible remedial actions may include one or more of the following: (a) automatically repairing the product and resetting the system status; (b) allowing the failed update to be reattempted (either from the first sequential step or beginning at the sequential step during which failure occurred); (c) preventing the user from applying additional maintenance until the corrupted software program is recovered (e.g. further corruption may be blocked while in failure recovery mode); (d) warning the user that the product is corrupted and that customer support must be contacted; (e) if the failure occurred during an uninstall process, allowing the user to re-attempt to uninstall the update and preventing the user from uninstalling other updates. Optionally, the software installation process may automatically notify a customer support center and/or transmit the tracking file to the customer support center. The information contained in the tracking file may facilitate problem resolution by human customer support technicians as well.

As has been described above, according to an aspect of the present invention, a preferred method tracks the current sequential step of the software installation process, and persists this tracking data in a tracking file. The method maintains this tracking file to track the current sequential step, as well as identification of the target software being installed (which may be a new installation, an update, or an installation from backup as part of an uninstall). In one embodiment, this tracking file is called install.status.xml.

In one particular embodiment, the install.status.xml file contains the following metadata:

<maintenancefilename>
<maintenancename>
<mode>

In a particular embodiment, the metadata <mode> may be one of INSTALLBACKUP, INSTALLUPDATE, INSTALLCONFIG, UNINSTALLCONFIG, UNINSTALLUPDATE, or COMPLETE.

In a preferred embodiment, the method dynamically maintains the install.status.xml tracking file while the software installation process is executing to preserve the current operational step. The method will update the mode prior to commencement of each respective phase (INSTALLBACKUP, INSTALLUPDATE, INSTALLCONFIG, UNINSTALLCONFIG, UNINSTALLUPDATE, COMPLETE). The method will set the COMPLETE mode at the end of any successful install or uninstall. In the event of a catastrophic failure, the tracking file will contain the last phase executed, and the maintenance package filename and ID. The method will detect this state the next time the method is carried out and, based on the information, the method will initiate a failure recovery process that may provide the user with appropriate options and instructions to recover, or may in some instances recover automatically.

An exemplary install.status.xml tracking file is shown below:

```
<?xml version="1.0" encoding="UTF-8"?>
<update maintenancefilename="6.0.1.0-AS-MIS-
SoftwareCoIA32-RP0000002.pak" maintenancename="FP8002"
mode="installbackup"/>
```

In this example, the tracking file indicates that the relevant software installation process is currently executing the backup step. If a catastrophic failure were to occur during this step, a method according to an aspect of the present invention would detect the failure upon reading the tracking file after being restarted, and would determine appropriate recovery actions based on this information (the step at which failure occurred).

An alternate embodiment of an install.status.xml tracking file may contain the following metadata:

```
<maintenancefilename>
<maintenancename>
<INSTALLBACKUP>
<INSTALLUPDATE>
<INSTALLCONFIG>
<UNINSTALLCONFIG>
<UNINSTALLUPDATE>
<COMPLETE>
```

This file structure provides for entry of specific data for each step of a software installation process. Thus, instead of overwriting a single <mode> metadata entry, a method according to the present invention could record specific metadata for each entry. For example, where the software installation process was the software installation process 401 shown in FIG. 4, an exemplary install.status.xml file could be:

```
<?xml version="1.0" encoding="UTF-8"?>
<updatemaintenancefilename="6.0.1.0-AS-MIS-
SoftwareCoIA32-RP0000002.pak" maintenancename="FP8002"
INSTALLBACKUP="DONE" INSTALLUPDATE="INPROGRESS"
INSTALLCONFIG="NOTSTART" UNINSTALLCONFIG="NOTDO"
UNINSTALLUPDATE="NOTDO" COMPLETE="NO" />
```

The metadata contained in the above exemplary install.status.xml file shows that the software installation process 401 has successfully completed the backup step 410, as indicated by the metadata "DONE" for INSTALLBACKUP. The above exemplary install.status.xml file also shows that the software installation process 401 is presently carrying out the write/overwrite/delete step 414 (as indicated by the metadata "INPROGRESS" for INSTALLUPDATE) and has not commenced the configuration process 418 (as indicated by the metadata "NOTSTART" for "INSTALLCONFIG"). Because the software installation process 401 has not yet completed successfully, the metadata for COMPLETE is set to "NO". In addition, it should be noted that because the software installation process 401 is not an uninstall, the metadata for both UNINSTALLCONFIG and UNINSTALLUPDATE are set to "NOTDO". An install.status.xml file such as that shown above may be useful where it is desired to retain a chronology of completed steps of a software installation process. It will be appreciated that after a method according to the present invention has checked to confirm that the COMPLETE metadata for an install.status.xml such as that shown above is set to "YES" (indicating successful completion of the most recent iteration), the method would then reinitialize the install.status.xml file by setting the relevant metadata to "NOTSTART" and setting the COMPLETE metadata to "NO". The initialization actions taken by the method would also set the metadata corresponding to a software installation process not then being implemented (such as the UNINSTALLCONFIG and UNINSTALLUPDATE metadata in the case of a new installation) to "NOTDO".

In addition to the two exemplary tracking files shown above, other types of tracking files may also be used in accordance with the present invention. More particularly, as much detail as is desired may be included in the metadata structure for the relevant tracking file. More detail may be desirable when installing some particular types of software programs than when installing other types of software programs.

As was noted above, in the event of a catastrophic failure, the tracking file will contain an identification of the last known phase of the software installation process. The tracking file is read whenever software implementing a method according to the present invention is initialized. Optionally, a particular software program installed in accordance with the present invention could be configured to read the tracking file for that software program each time that software program is initialized (for example, in the case of WAS, the relevant tracking file would be read before a WAS server started).

Figure 6:
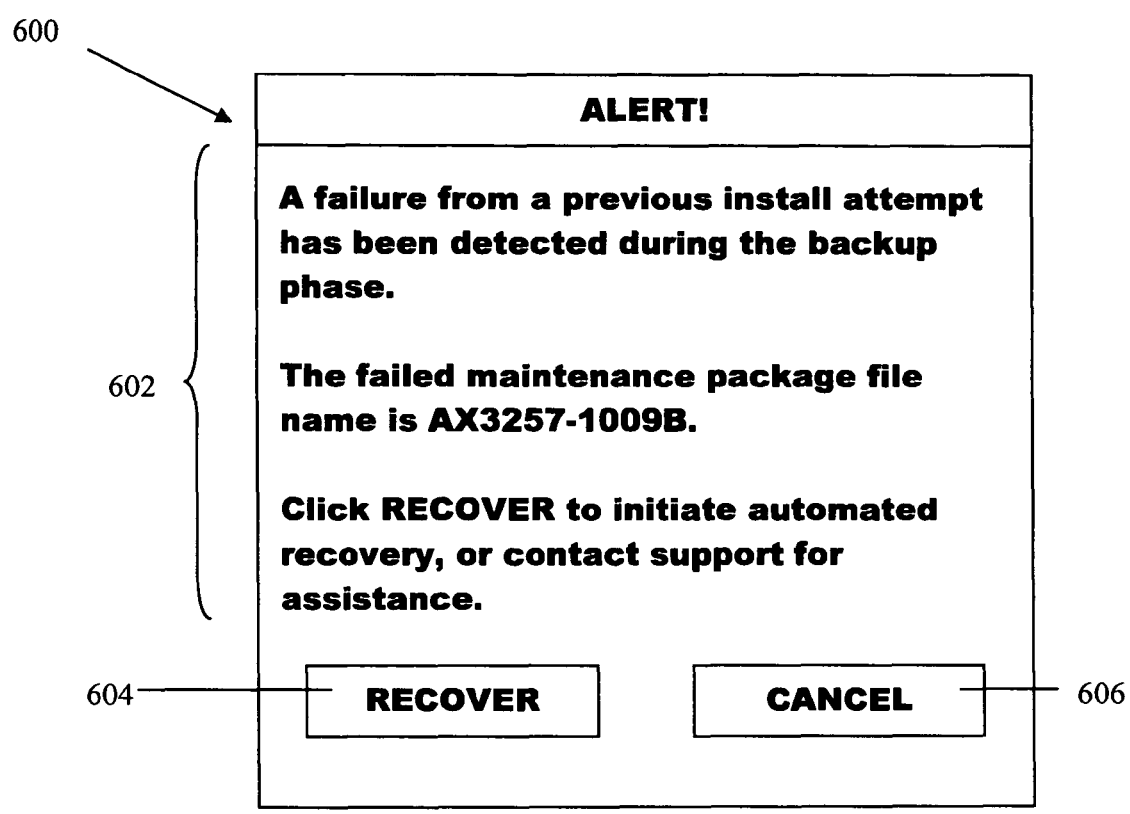
FIG. 6 is an exemplary interface for presenting a user with a first remedial option in accordance with an aspect of the present invention.

If the tracking file indicates a previous failure (e.g. the <mode> metadata in the first exemplary update.status.xml file is not set to COMPLETE), then the method may propose one or more remedial actions to the user (or may undertake the remedial actions automatically), with the precise remedial action(s) depending on the step during which the failure occurred. Possible remedial actions for each phase are outlined below.

Where the tracking file indicates that the failure occurred during the backup step (e.g. <mode> in the first exemplary update.status.xml file is set to INSTALLBACKUP), generally no updates will yet have been applied to the system, and the system will usually not be in a corrupted state. In this instance, the method will preferably present the user with an option to autorecover the system, as shown in FIG. 6. A dialogue box is shown generally at 600, and text 602 informs the user of the failure condition. In the particular embodiment shown, the text message reads "A failure from a previous install attempt has been detected during the backup phase. The failed maintenance package file name is AX3257-3009B. Click RECOVER to initiate automated recovery, or contact support for assistance." By selecting the "RECOVER" box 604, the user can initiate an automated recovery process. Alternatively, a user may select the "CANCEL" box 606 to instruct the data processing system not to initiate the automated recovery process.

In one exemplary embodiment, the automated recovery process carries out the following steps: (a) delete any backup files made during the step in which failure occurred (one or more of these files may not be valid because the failure occurred during the backup step); (b) update any relevant product history metadata to reflect that the software installation process for the relevant software program was not completed; and (c) reset the step metadata in the tracking file (such as install.status.xml) to indicate "COMPLETE".

Where the tracking file indicates that the failure occurred during the write/overwrite step (e.g. <mode> in the first exemplary update.status.xml file is set to INSTALLUPDATE) or the reconfiguration step (e.g. <mode> in the first exemplary update.status.xml file is set to INSTALLCONFIG) of a new installation process or an update process, the catastrophic failure occurred while the software installation process was updating the data processing system with new files or reconfiguring the data processing system. The data processing system is therefore very likely to be corrupted and may require support and/or service to restore. In order to prevent further corruption of the data processing system, no further software programs should be installed on the system.

Figure 7:
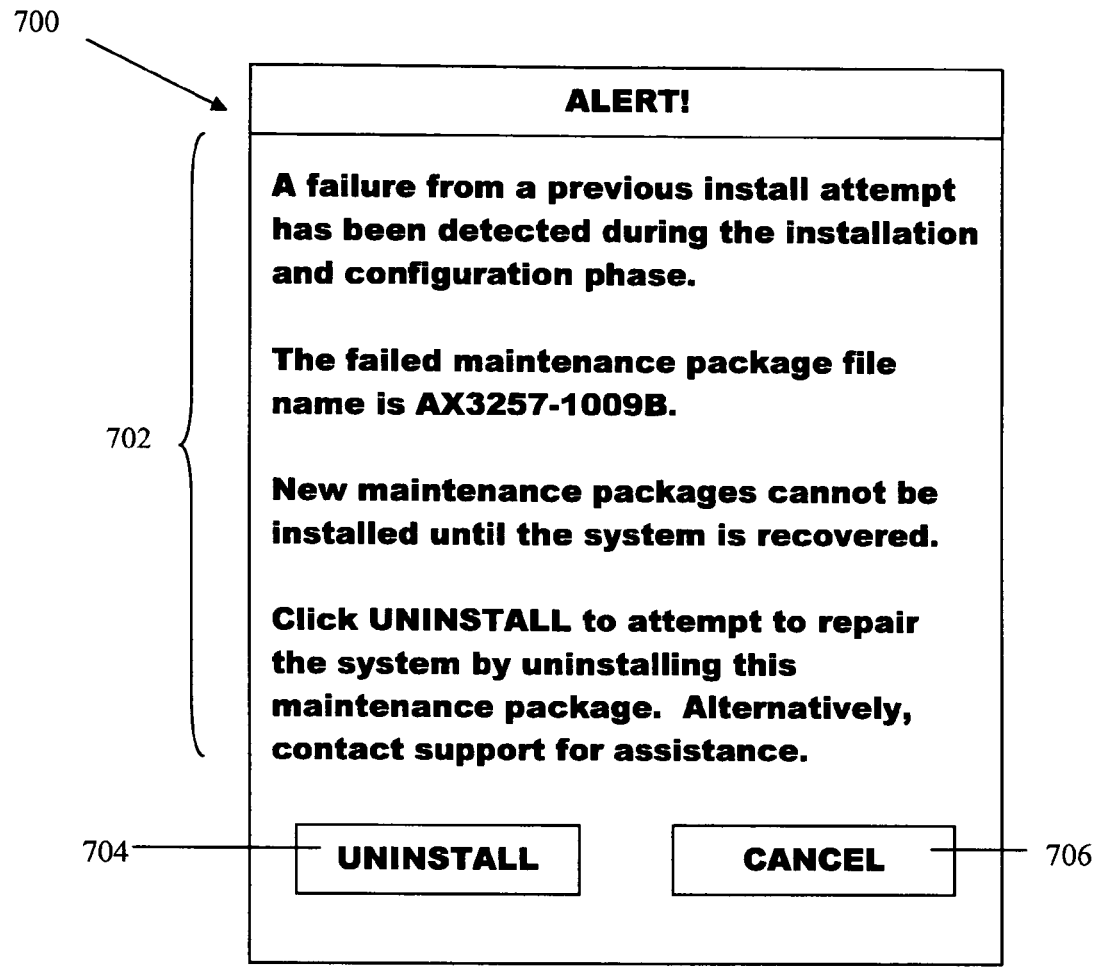
FIG. 7 is an exemplary interface for presenting a user with a second remedial option in accordance with an aspect of the present invention.

In a situation in which a catastrophic failure occurred during the write/overwrite/delete step or the reconfiguration step, the data processing system can usually be recovered by uninstalling the software program (that is, installing the backup created during the backup step as described above, using a process such as software installation process 501 shown in FIG. 5). Therefore, in an exemplary embodiment, the method presents a user of the data processing system with the option to uninstall the software program. Referring now to FIG. 7, a dialogue box is shown generally at 700. Text 702 informs the user of the failure condition. In the exemplary embodiment shown in FIG. 7, the text 702 reads "A failure from a previous install attempt has been detected during the installation and configuration phase. The failed maintenance package file name is AX3257-3009B. New maintenance packages cannot be installed until the system is recovered. Click UNINSTALL to attempt to repair the system by uninstalling this maintenance package. Alternatively, contact support for assistance." By selecting the "UNINSTALL" box 704, the user can cause the data processing system to execute a software installation process (such as the software installation process 501 depicted in FIG. 5) to uninstall the software program for which installation failed. Preferably, such an uninstall process would be executed in accordance with a method according to an aspect of the present invention (such as the method 500 in FIG. 5). Alternatively, by selecting the "CANCEL" box 706, a user can instruct the data processing system not to initiate the uninstall process. Generally, uninstalling the failed package using the presumably good backup will allow a user to restore the data processing system to a non-corrupted state without the need for external assistance.

Where the tracking file indicates that the failure occurred during the write/overwrite/delete step (e.g. <mode> in the first exemplary update.status.xml file is set to UNINSTALLUPDATE) or the reconfiguration step (e.g. <mode> in the first exemplary update.status.xml file is set to UNINSTALLCONFIG) of an uninstall process, the catastrophic failure occurred while the software installation process was attempting to uninstall a software program by installing the files from the backup record for that software package or reconfiguring the data processing system based on the backup record. The data processing system is therefore likely to be corrupted and may require support and/or service to restore it to a non-corrupted state. In order to avoid further corruption of the data processing system, no further software programs should be installed on the system until the system is recovered.

Because the backup record will usually not have been damaged by the catastrophic failure, a user of the data processing system may make a second attempt to uninstall the software program for which installation previously failed (i.e. attempt to install the backup again). If the second attempt to uninstall the software program is successful, then the system will be recovered. Accordingly, in an exemplary embodiment, if the software installation process detects that a failure occurred while the software installation process was attempting to uninstall a software program by installing the files from the backup record for that software package or reconfiguring the data processing system based on the backup record, the method will present the user with an option to attempt the uninstall process (installation of backups) again.

Figure 8:
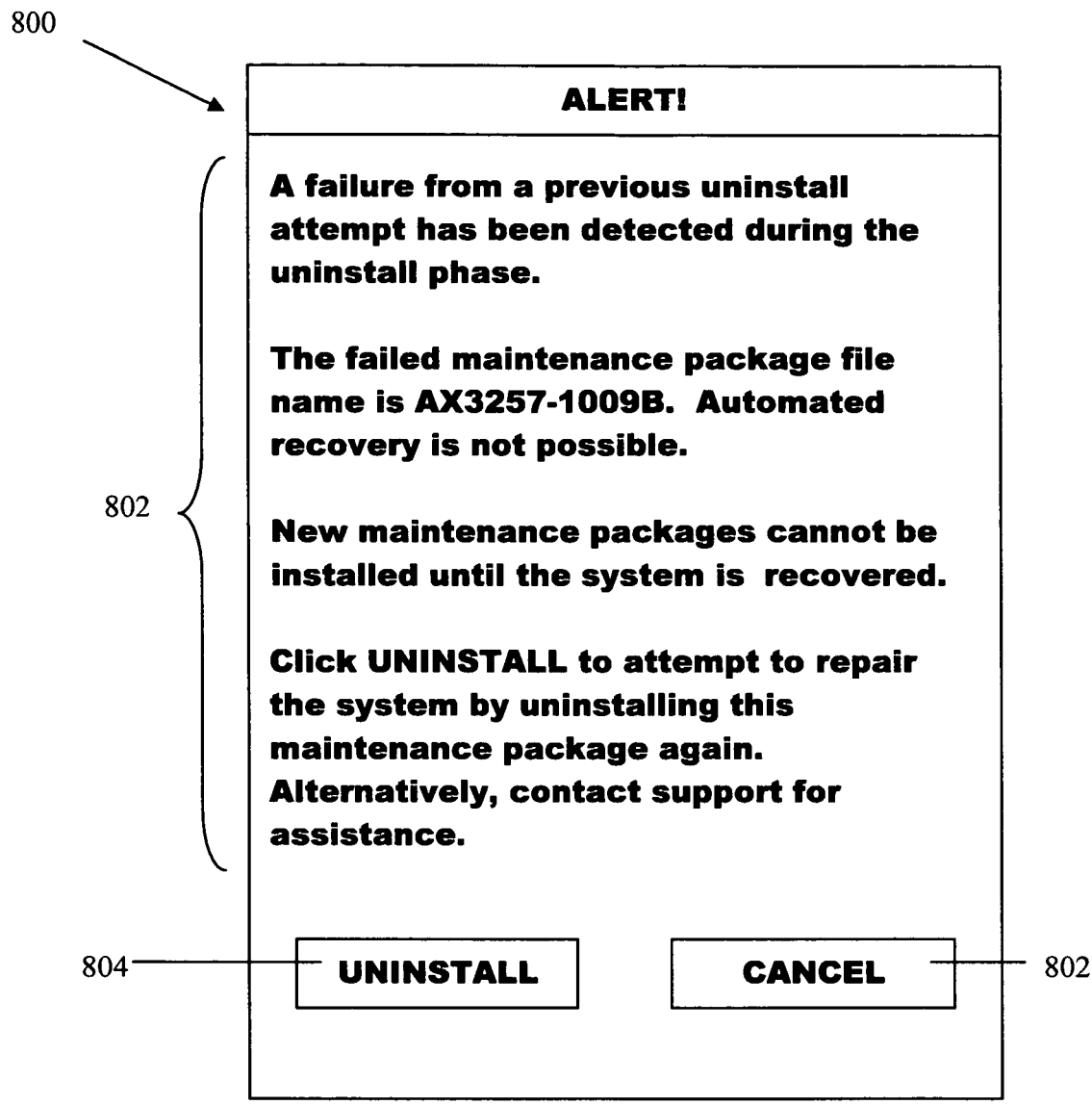
FIG. 8 is an exemplary interface for presenting a user with a third remedial option in accordance with an aspect of the present invention.

Referring now to FIG. 8, a dialogue box is shown generally at 800. Text 802 informs the user of the failure condition. In the exemplary embodiment shown in FIG. 8, the text 802 reads "A failure from a previous uninstall attempt has been detected during the uninstall phase. The failed maintenance package file name is AX3257-3009B. Automated recovery is not possible. New maintenance packages cannot be installed until the system is recovered. Click UNINSTALL to attempt to repair the system by uninstalling this maintenance package again. Alternatively, contact support for assistance." By selecting the "UNINSTALL" box 804, the user can cause the data processing system to re-execute the software installation process for uninstalling software (such as the software installation process depicted in FIG. 5) that had previously failed. Alternatively, by selecting the "CANCEL" box 806, a user can instruct the data processing system not to retry the uninstall process. Generally, uninstalling the failed package using the presumably good backup will allow a user to restore the data processing system to a non-corrupted state without the need for external assistance. Accordingly, if the second attempt to uninstall the software is successful, the data processing system will usually be restored to a non-corrupted state.

The user interface dialogue boxes shown in FIGS. 6, 7 and 8 are exemplary only, and many other dialogue boxes may be implemented within the scope of the present invention. For example, in some instances the dialogue boxes (such as dialogue boxes 600, 700 and 800) may not present the user with buttons (such as buttons 604, 704 and 804) by which the user could automatically initiate a recovery process. Instead, a dialogue box may direct the user to manually initiate a recovery process. For example, a message to the user could be "System is in failure recovery mode. System must be recovered by uninstalling the maintenance using the backup. Please go to the backup panel and choose to uninstall". What is desirable is that the data processing system should prevent the user from installing other software programs or installing different backups until the system is recovered, since such actions will usually compound the corruption of the data processing system. The data processing system may prevent the user from installing other software programs or installing different backups by hiding these options from the user, or by temporarily disabling these options until the data processing system has been restored to a non-corrupted state.

It will be appreciated that the particular recovery options described herein are merely examples of recovery options that may be desirable in particular instances. Other recovery options may be available, depending on the particular step at which the failure occurred. The choice of recovery options may also be influenced by the particular software program that is being installed or uninstalled, and/or by the nature of the data processing system. In addition, the level of detail in the tracking file may also influence the number of recovery options available and the selection of such recovery options.

The present invention can take the form of an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

As described above, the present invention may be implemented on a data processing system. A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

While certain particular embodiments of aspects of the present invention have been described in order to facilitate understanding, these embodiments are exemplary only and are not intended to limit the scope of the present invention. It will appreciated that numerous modifications and adaptations to the described embodiments may be made without departing from the scope of the present invention as defined by the appended claims.

What is claimed is:

1. A computer-implemented method of implementing, for a data processing system, a software installation process for a software program, the software installation process comprising a plurality of sequential steps, the method comprising:
   maintaining, in recoverable storage across multiple iterations of the software installation process, installation state metadata comprising a step metadata mode indicator for the plurality of sequential steps that specifies a prior completion state of a prior installation of at least a portion of the software program;
   performing recovery processing of the software program in response to determining that the installation state metadata from the prior installation indicates an incomplete installation state of the at least the portion of the software program; and
   updating in the recoverable storage, prior to commencement of each sequential step of a current iteration of the software installation process commenced, the installation state metadata with a value of the step metadata mode indicator that identifies an installation state of the sequential step so that the installation state metadata is associated with the software program;
   where:
      the updated installation state metadata in the recoverable storage is recoverable during a subsequent iteration of the software installation process to determine whether the current iteration of the software installation process successfully updated the software program; and
      the installation state metadata comprises a backup step in the software installation process for uninstalling the software program.

2. The method of claim 1, where updating in the recoverable storage, prior to commencement of each sequential step of the current iteration of the software installation process commenced, the installation state metadata with the value of the step metadata mode indicator that identifies the installation state of the sequential step comprises setting, in the recoverable storage, the value of the step metadata mode indicator to identify a completed state for the current iteration of the software installation process in response to completion of a last sequential step of the current iteration of the software installation process.

3. The method of claim 2, where updating in the recoverable storage, prior to commencement of each sequential step of the current iteration of the software installation process commenced, the installation state metadata with the value of the step metadata mode indicator that identifies the installation state of the sequential step comprises updating the installation state metadata corresponding to each sequential step prior to commencement of the sequential step to which the installation state metadata corresponds.

4. The method of claim 3, further comprising:
   prior to initiating the current iteration of the software installation process, checking the value of the step metadata mode indicator of a metadata record from a most recent previous iteration of the software installation process to determine whether a failure occurred during the most recent previous iteration of the software installation process;
   responsive to a determination that no failure occurred during the most recent previous iteration of the software installation process, initiating the current iteration of the software installation process; and
   where performing the recovery processing of the software program in response to determining that the installation state metadata from the prior installation indicates the incomplete installation state of the at least the portion of the software program comprises, responsive to a determination that the failure occurred during the most recent previous iteration of the software installation process, presenting a user of the data processing system with one or more options for remedial action.

5. The method of claim 4, where the one or more options for remedial action comprise one or more procedures selected from a plurality of predefined procedures in response to identification of the sequential step of the most recent previous iteration of the software installation process at which the failure occurred.

6. The method of claim 1, where the plurality of sequential steps of the software installation process comprises:
   first creating a backup record for the software program, the backup record comprising copies of each file to be affected by the current iteration of the software installation process and further comprising at least a portion of the installation state metadata sufficient to enable restoration of the software program;
   doing at least one of writing one or more new files, deleting one or more existing files, and overwriting one or more existing files to generate a modified software program that is usable by the data processing system; and
   executing a configuration process to reconfigure the data processing system to utilize the modified software program.

7. The method of claim 6, where the configuration process is executed prior to the step of doing at least one of writing one or more new files, deleting one or more existing files, and overwriting one or more existing files to generate the modified software program.

8. The method of claim 6, where the configuration process is executed after the step of doing at least one of writing one or more new files, deleting one or more existing files, and overwriting one or more existing files to generate the modified software program.

9. The method of claim 6, where the configuration process comprises:
   a first portion that is executed prior to the step of doing at least one of writing one or more new files, deleting one or more existing files, and overwriting one or more existing files to generate the modified software program; and
   a second portion that is executed after the step of doing at least one of writing one or more new files, deleting one or more existing files, and overwriting one or more existing files to generate the modified software program.

10. The method of claim 1, where the plurality of sequential steps of the software installation process comprises:
    first creating a backup record for the data processing system, the backup record comprising copies of each file to be affected by the software installation process, and further comprising at least a portion of the installation state metadata sufficient to enable restoration of the data processing system to a state that existed prior to commencement of the current iteration of the software installation process;
    doing at least one of writing one or more new files and overwriting one or more existing files so as to place the software program in persistent storage accessible by the data processing system so that the software program is usable by the data processing system; and
    executing a configuration process to reconfigure the data processing system to utilize the software program.

11. The method of claim 10, where the configuration process comprises:
    a first portion that is executed prior to the step of doing at least one of writing one or more new files and overwriting one or more existing files to place the software program in the persistent storage accessible by the data processing system; and
    a second portion that is executed after the step of doing at least one of writing one or more new files and overwriting one or more existing files to place the software program in the persistent storage accessible by the data processing system.

12. The method of claim 1, where the plurality of sequential steps of the software installation process comprises:
    doing at least one of writing one or more files, overwriting one or more existing files, and deleting one or more existing files so as to return an aspect of a persistent storage accessible to the data processing system to a state that existed prior to installation of the software program; and
    executing a configuration process to reconfigure an aspect of the data processing system to a configuration that existed prior to installation of the software program.

13. The method of claim 1, where updating in the recoverable storage, prior to commencement of each sequential step of the current iteration of the software installation process commenced, the installation state metadata with the value of the step metadata mode indicator that identifies the installation state of the sequential step comprises updating the value of the step metadata mode indicator within an installation status extensible markup language (XML) tracking file.

14. The method of claim 13, where the step metadata mode indicator comprises a tag within the installation status XML tracking file.

15. A computer program product comprising a computer-usable storage device having computer-usable program code for implementing, for a data processing system, a software installation process for a software program, the software installation process comprising a plurality of sequential steps, the computer program product comprising:
    computer-usable program code for maintaining, in recoverable storage across multiple iterations of the software installation process, installation state metadata comprising a step metadata mode indicator for the plurality of sequential steps that specifies a prior completion state of a prior installation of at least a portion of the software program;
    computer-usable program code for performing recovery processing of the software program in response to determining that the installation state metadata from the prior installation indicates an incomplete installation state of the at least the portion of the software program; and
    computer-usable program code for updating in the recoverable storage, prior to commencement of each sequential step of a current iteration of the software installation process commenced, the installation state metadata with a value of the step metadata mode indicator that identifies an installation state of the sequential step so that the installation state metadata is associated with the software program;
    where:
        the updated installation state metadata in the recoverable storage is recoverable during a subsequent iteration of the software installation process to determine whether the current iteration of the software installation process successfully updated the software program; and
        the installation state metadata comprises a backup step in the software installation process for uninstalling the software program.

16. The computer program product of claim 15, where the computer-usable program code for updating in the recoverable storage, prior to commencement of each sequential step of the current iteration of the software installation process commenced, the installation state metadata with the value of the step metadata mode indicator that identifies the installation state of the sequential step comprises computer-usable program code for setting, in the recoverable storage, the value of the step metadata mode indicator to identify a completed state for the current iteration of the software installation process in response to completion of a last sequential step of the current iteration of the software installation process.

17. The computer program product of claim 16, where the computer-usable program code for updating in the recoverable storage, prior to commencement of each sequential step of the current iteration of the software installation process commenced, the installation state metadata with the value of the step metadata mode indicator that identifies the installation state of the sequential step comprises computer-usable program code for updating the installation state metadata corresponding to each sequential step prior to commencement of the sequential step to which the installation state metadata corresponds.

18. The computer program product of claim 17, further comprising:
   computer-usable program code for checking, prior to initiation of the current iteration of the software installation process, the value of the step metadata mode indicator of a metadata record from a most recent previous iteration of the software installation process to determine whether a failure occurred during the most recent previous iteration of the software installation process;
   computer-usable program code for initiating the current iteration of the software installation process in response to a determination that no failure occurred during the most recent previous iteration of the software installation process; and
   where the computer-usable program code for performing recovery processing of the software program in response to determining that the installation state metadata from the prior installation indicates the incomplete installation state of the at least the portion of the software program comprises computer-usable program code for presenting a user of the data processing system with one or more options for remedial action in response to a determination that the failure occurred during the most recent previous iteration of the software installation process.

19. The computer program product of claim 18, where the one or more options for remedial action comprise one or more procedures selected from a plurality of predefined procedures in response to identification of the sequential step of the most recent previous iteration of the software installation process at which the failure occurred.

20. The computer program product of claim 18, where the computer-usable program code for implementing, for the data processing system, the software installation process for the software program, the software installation process comprising the plurality of sequential steps, comprises:
   computer-usable program code for carrying out a first sequential step of creating a backup record for the software program, the backup record comprising copies of each file to be affected by the current iteration of the software installation process and further comprising at least a portion of the installation state metadata sufficient to enable restoration of the software program;
   computer-usable program code for carrying out a sequential step of doing at least one of writing one or more new files, deleting one or more existing files and overwriting one or more existing files to generate a modified software program that is usable by the data processing system; and
   computer-usable program code for carrying out a sequential step of executing a configuration process to reconfigure the data processing system to utilize the modified software program.

21. The computer program product of claim 20, where in operation the computer-usable program code for carrying out the sequential step of executing the configuration process is executed prior to execution of the computer-usable program code for carrying out the sequential step of doing at least one of writing one or more new files, deleting one or more existing files, and overwriting one or more existing files to generate the modified software program.

22. The computer program product of claim 20, where in operation the computer-usable program code for carrying out the sequential step of executing the configuration process is executed after execution of the computer-usable program code for carrying out the sequential step of doing at least one of writing one or more new files, deleting one or more existing files, and overwriting one or more existing files to generate the modified software program.

23. The computer program product of claim 20, where the computer-usable program code for carrying out the sequential step of executing the configuration process comprises:
   computer-usable program code for executing a first portion of the configuration process prior to execution of the computer-usable program code for carrying out the sequential step of doing at least one of writing one or more new files, deleting one or more existing files and overwriting one or more existing files to generate the modified software program; and
   computer-usable program code for executing a second portion of the configuration process after execution of the computer-usable program code for carrying out the sequential step of doing at least one of writing one or more new files, deleting one or more existing files and overwriting one or more existing files to generate the modified software program.

24. The computer program product of claim 18, where the computer-usable program code for implementing, for the data processing system, the software installation process for the software program, the software installation process comprising the plurality of sequential steps, comprises:
   computer-usable program code for carrying out a first sequential step of creating a backup record for the data processing system, the backup record comprising copies of each file to be affected by the software installation process and further comprising at least a portion of the installation state metadata sufficient to enable restoration of the data processing system to a state that existed prior to commencement of the current iteration of the software installation process;
   computer-usable program code for carrying out a sequential step of doing at least one of writing one or more new files and overwriting one or more existing files so as to place the software program in persistent storage accessible by the data processing system so that the software program is usable by the data processing system; and
   computer-usable program code for a sequential step of executing a configuration process to reconfigure the data processing system to utilize the software program.

25. The computer program product of claim 24, where the configuration process comprises:
   computer-usable program code for executing a first portion of the configuration process prior to execution of the computer-usable program code for carrying out the sequential step of doing at least one of writing one or more new files and overwriting one or more existing files to place the software program in the persistent storage accessible by the data processing system; and
   computer-usable program code for executing a second portion of the configuration process after execution of the computer-usable program code for carrying out the sequential step of doing at least one of writing one or more new files and overwriting one or more existing files to place the software program in the persistent storage accessible by the data processing system.

26. The computer program product of claim 18, where the computer-usable program code for implementing, for the data processing system, the software installation process for the software program, the software installation process comprising the plurality of sequential steps, comprises:
  computer-usable program code for carrying out a sequential step of doing at least one of writing one or more files, overwriting one or more existing files and deleting one or more existing files so as to return an aspect of a persistent storage accessible to the data processing system to a state that existed prior to installation of the software program; and
  computer-usable program code for carrying out a sequential step of executing a configuration process to reconfigure an aspect of the data processing system to a configuration that existed prior to installation of the software program.

27. The computer program product of claim 15, where the computer-usable program code for updating in the recoverable storage, prior to commencement of each sequential step of the current iteration of the software installation process commenced, the installation state metadata with the value of the step metadata mode indicator that identifies the installation state of the sequential step comprises computer-usable program code for updating the value of the step metadata mode indicator within an installation status extensible markup language (XML) tracking file.

28. The computer program product of claim 27, where the step metadata mode indicator comprises a tag within the installation status XML tracking file.

29. A data processing system comprising:
  a processor;
  a bus coupled to the processor; and
  a computer usable medium coupled to the bus, wherein the computer usable medium contains a set of instructions for implementing a software installation process for a software program, the software installation process comprising a plurality of sequential steps, where the processor is programmed to carry out the set of instructions by causing the data processing system to:
    maintain, in recoverable storage across multiple iterations of the software installation process, installation state metadata comprising a step metadata mode indicator for the plurality of sequential steps that specifies a prior completion state of a prior installation of at least a portion of the software program;
    perform recovery processing of the software program in response to determining that the installation state metadata from the prior installation indicates an incomplete installation state of the at least the portion of the software program; and
    update in the recoverable storage, prior to commencement of each sequential step of a current iteration of the software installation process commenced, the installation state metadata with a value of the step metadata mode indicator that identifies an installation state of the sequential step so that the installation state metadata is associated with the software program;
  where:
    the updated installation state metadata in the recoverable storage is recoverable during a subsequent iteration of the software installation process to determine whether the current iteration of the software installation process successfully updated the software program; and
    the installation state metadata comprises a backup step in the software installation process for uninstalling the software program.

30. The data processing system of claim 29, where the processor, in causing the data processing system to update in the recoverable storage, prior to commencement of each sequential step of the current iteration of the software installation process commenced, the installation state metadata with the value of the step metadata mode indicator that identifies the installation state of the sequential step, is programmed to carry out the set of instructions by causing the data processing system to set, in the recoverable storage, the value of the step metadata mode indicator to identify a completed state for the current iteration of the software installation process in response to completion of a last sequential step of the current iteration of the software installation process.

31. The data processing system of claim 30, where the processor, in causing the data processing system to update in the recoverable storage, prior to commencement of each sequential step of the current iteration of the software installation process commenced, the installation state metadata with the value of the step metadata mode indicator that identifies the installation state of the sequential step, is programmed to carry out the set of instructions by causing the data processing system to update the installation state metadata corresponding to each sequential step prior to commencement of the sequential step to which the installation state metadata corresponds.

32. The data processing system of claim 31, where the processor is further programmed to carry out the set of instructions by causing the data processing system to:
  check, prior to initiating the current iteration of the software installation process, the value of the step metadata mode indicator of a metadata record from a most recent previous iteration of the software installation process to determine whether a failure occurred during the most recent previous iteration of the software installation process;
  initiate the current iteration of the software installation process in response to a determination that no failure occurred during the most recent previous iteration of the software installation process; and
  where, in being programmed to carry out the set of instructions by causing the data processing system to perform recovery processing of the software program in response to determining that the installation state metadata from the prior installation indicates an incomplete installation state of the at least the portion of the software program, the processor is programmed to carry out the set of instructions by causing the data processing system to present a user of the data processing system with one or more options for remedial action in response to a determination that the failure occurred during the most recent previous iteration of the software installation process.

33. The data processing system of claim 32, where the one or more options for remedial action comprise one or more procedures selected from a plurality of predefined procedures in response to identification of the sequential step of the most recent previous iteration of the software installation process at which the failure occurred.

34. The data processing system of claim 29, where the plurality of sequential steps of the software installation process comprise:

first creating a backup record for the software program, the backup record comprising copies of each file to be affected by the current iteration of the software installation process and further comprising at least a portion of the installation state metadata sufficient to enable restoration of the software program;

doing at least one of writing one or more new files, deleting one or more existing files and overwriting one or more existing files to generate a modified software program that is usable by the data processing system; and executing a configuration process to reconfigure the data processing system to utilize the modified software program.

35. The data processing system of claim 34, where the processor is programmed to carry out the set of instructions to cause the data processing system to execute the configuration process prior to causing the data processing system to do at least one of writing one or more new files, deleting one or more existing files, and overwriting one or more existing files to generate the modified software program.

36. The data processing system of claim 34, where the processor is programmed to carry out the set of instructions by causing the data processing system to execute the configuration process after causing the data processing system to do at least one of writing one or more new files, deleting one or more existing files, and overwriting one or more existing files to generate the modified software program.

37. The data processing system of claim 34, where the processor is programmed to carry out the set of instructions by causing the data processing system to:

execute a first portion of the configuration process prior to doing at least one of writing one or more new files, deleting one or more existing files and overwriting one or more existing files to generate the modified software program; and execute a second portion of the configuration process after doing at least one of writing one or more new files, deleting one or more existing files and overwriting one or more existing files to generate the modified software program.

38. The data processing system of claim 29, where the plurality sequential steps of the software installation process comprise:

first creating a backup record for the data processing system, the backup record comprising copies of each file to be affected by the software installation process and further comprising at least a portion of the installation state metadata sufficient to enable restoration of the data processing system to a state that existed prior to commencement of the current iteration of the software installation process;

doing at least one of writing one or more new files and overwriting an existing file so as to place the software program in persistent storage accessible by the data processing system so that the software program is usable by the data processing system; and executing a configuration process to reconfigure the data processing system to utilize the software program.

39. The data processing system of claim 34, where the processor is programmed to carry out the set of instructions to cause the data processing system to:

execute a first portion of the configuration process prior to doing at least one of writing one or more new files and overwriting one or more existing files to place the software program in the persistent storage accessible by the data processing system; and execute a second portion of the configuration process after doing at least one of writing one or more new files and overwriting one or more existing files to place the software program in the persistent storage accessible by the data processing system.

40. The data processing system of claim 29, where the plurality of sequential steps of the software installation process comprise:

doing at least one of writing one or more files, overwriting one or more existing files and deleting one or more existing files so as to return an aspect of a persistent storage accessible to the data processing system to a state that existed prior to installation of the software program; and executing a configuration process to reconfigure an aspect of the data processing system to a configuration that existed prior to installation of the software program.

41. The data processing system of claim 29, where the processor, in causing the data processing system to update in the recoverable storage, prior to commencement of each sequential step of the current iteration of the software installation process commenced, the installation state metadata with the value of the step metadata mode indicator that identifies the installation state of the sequential step, is programmed to carry out the set of instructions by causing the data processing system to update the value of the step metadata mode indicator within an installation status extensible markup language (XML) tracking file.

42. The data processing system of claim 41, where the step metadata mode indicator comprises a tag within the installation status XML tracking file.

\* \* \* \* \*